US009349416B2

(12) United States Patent
Okamoto

(10) Patent No.: US 9,349,416 B2
(45) Date of Patent: May 24, 2016

(54) OPTICAL DISK APPARATUS AND DISK MAGAZINE

(71) Applicants: Hitachi-LG Data Storage, Inc., Tokyo (JP); Hitachi Consumer Electronics Co., Ltd., Tokyo (JP)

(72) Inventor: Tomomi Okamoto, Yokohama (JP)

(73) Assignees: HITACHI—LG DATA STORAGE, INC., Tokyo (JP); HITACHI CONSUMER ELECTRONICS CO., LTD., Tokyo (JP)

(*) Notice: Subject to any disclaimer, the term of this patent is extended or adjusted under 35 U.S.C. 154(b) by 0 days.

(21) Appl. No.: 13/875,666

(22) Filed: May 2, 2013

(65) Prior Publication Data

US 2014/0003899 A1 Jan. 2, 2014

(30) Foreign Application Priority Data

Jun. 29, 2012 (JP) ................................. 2012-146302

(51) Int. Cl.
*B65B 21/02* (2006.01)
*G11B 33/04* (2006.01)
*G11B 23/03* (2006.01)
*G11B 17/22* (2006.01)

(52) U.S. Cl.
CPC .......... *G11B 33/0444* (2013.01); *G11B 17/223* (2013.01); *G11B 23/0323* (2013.01)

(58) Field of Classification Search
CPC ................................. H01L 21/67; H01L 21/00
USPC ........................ 414/411, 416.07, 416.08, 937; 206/308.1; 369/30.51, 30.58
See application file for complete search history.

(56) References Cited

U.S. PATENT DOCUMENTS 6,047,821 A * 4/2000 Hashimoto .......... G11B 33/045
206/303
6,378,696 B1 * 4/2002 Smouha .................... A45C 9/00
206/18
2005/0007898 A1 1/2005 Maeda
(Continued)

FOREIGN PATENT DOCUMENTS

CN 1941126 A 4/2007
CN 101740081 A 6/2010
(Continued)

OTHER PUBLICATIONS

Office Action, mailed Aug. 5, 2015, which issued during the prosecution of Chinese Patent Application No. 201310172618.1, which corresponds to the present application (partial English translation attached).

*Primary Examiner* — Saul Rodriguez
*Assistant Examiner* — Willie Berry, Jr.
(74) *Attorney, Agent, or Firm* — Baker Botts L.L.P.

(57) ABSTRACT

An optical disk apparatus and a disk magazine. Optical disks are stacked and contained in the disk magazine without a gap between adjacent disks. A disk holding member for preventing the optical disks from being rubbed and damaged in the disk magazine is provided in the disk magazine. The optical disk apparatus using the disk magazine has a disk holding portion for holding a plurality of optical disks in a lump. When the Nth optical disk from the top disk in the disk magazine is conveyed to a disk drive, the stacked N optical disks are held by the disk holding portion, the holding of only the Nth optical disk by the disk holding portion is cancelled and the target optical disk is conveyed by a disk drive portion.

3 Claims, 9 Drawing Sheets

(56) References Cited

U.S. PATENT DOCUMENTS

2009/0081014 A1* 3/2009 Contes .......................... 414/411
2010/0138583 A1* 6/2010 Schauer ........................ 710/312
2012/0076619 A1* 3/2012 Takahashi et al. ............ 414/217

FOREIGN PATENT DOCUMENTS

| JP | 2005-31930 | 2/2005 |
| JP | 2008-186552 | 8/2008 |

* cited by examiner

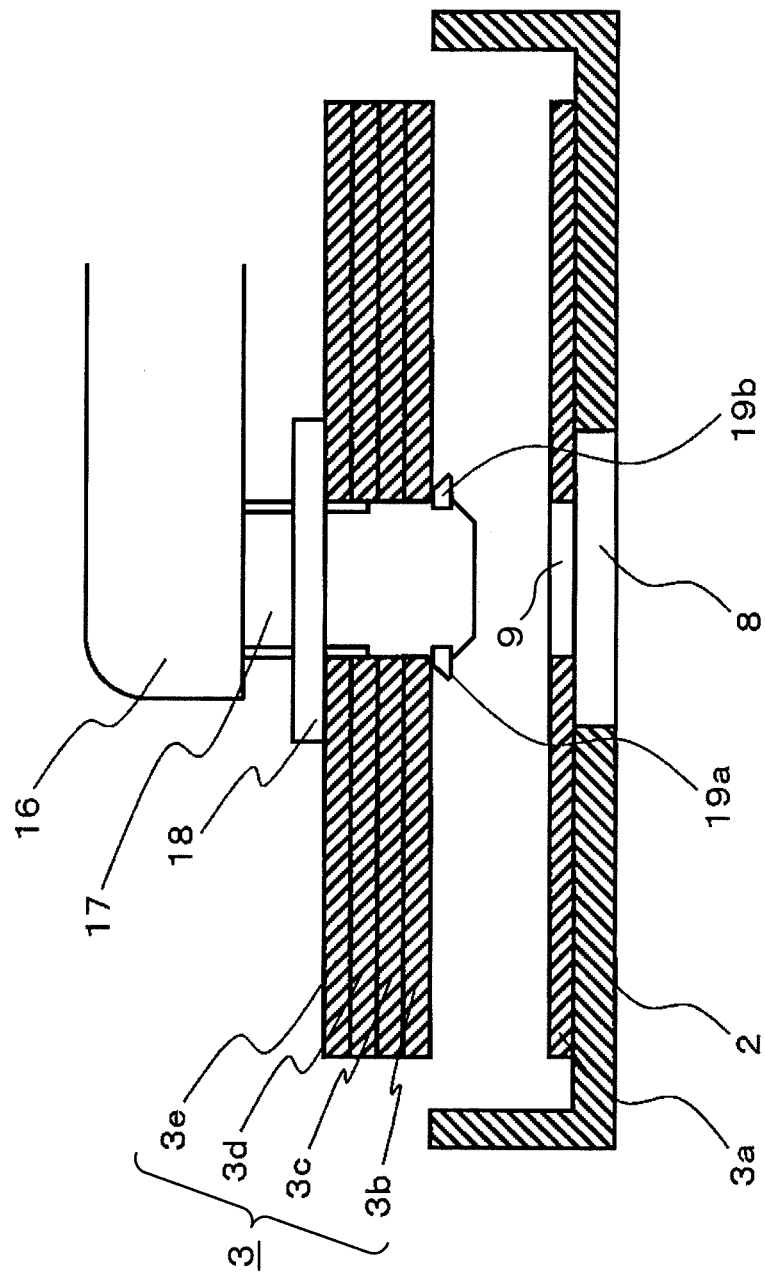

OPTICAL DISK APPARATUS AND DISK MAGAZINE

INCORPORATION BY REFERENCE

The present application claims priority from Japanese application JP2012-146302 filed on Jun. 29, 2012, the content of which is hereby incorporated by reference into this application.

BACKGROUND OF THE INVENTION

The invention relates to a disk magazine containing a plurality of optical disks therein and to an optical disk apparatus using such a disk magazine.

In an optical disk apparatus using optical disks, such a system that a plurality of optical disks are contained in a disk magazine and used has been proposed.

For example, the Official Gazette of JP-A-2005-31930 discloses a library apparatus of a large capacity and a high response speed using a disk magazine. The Official Gazette of JP-A-2008-186552 discloses such a construction that sheet-like optical disks having ferromagnetic rings are stacked.

SUMMARY OF THE INVENTION

In the case where optical disks are contained in a disk magazine and used, a method whereby partition plates are provided among the optical disks to thereby separate the optical disks or a method whereby a tray is used for each optical disk and each disk is handled has been proposed. For example, the Official Gazette of JP-A-2005-31930 discloses such a system that optical disks are put on a tray one by one and each disk is handled. In the case of such a system, as a thickness of disk magazine, thicknesses of the partition plates or trays are necessary in addition to thicknesses of the optical disks, so that the thickness of disk magazine is increased.

The Official Gazette of JP-A-2008-186552 discloses such a system that the optical disks having the ferromagnetic rings are stacked and contained. In this case, as a thickness of disk magazine, thicknesses of the ferromagnetic rings are necessary in addition to thicknesses of the optical disks, so that the disk magazine becomes thick. In order to take out an arbitrary optical disk from the stacked optical disks, since it is necessary to sequentially take out the optical disks from the upper optical disk among the stacked optical disks, it is difficult to take out an arbitrary optical disk at a high speed.

It is an object of the invention to realize a thin dimension of a disk magazine having a plurality of optical disks therein and to realize an optical disk apparatus using such a disk magazine.

The above problems are solved by the inventions according to claims.

For example, optical disks are stacked and contained without forming gaps in a disk magazine. A disk holding member for preventing the optical disks from being rubbed and damaged in the disk magazine is disposed in the disk magazine. An optical disk apparatus using the disk magazine has a disk holding portion for holding a plurality of optical disks in a lump, when the Nth optical disk from the top disk in the disk magazine is conveyed to the disk magazine, N optical disks are held by the disk holding portion, the holding of only the Nth optical disk by the disk holding portion is cancelled by a disk drive portion, and the target optical disk is conveyed.

According to the invention, the thin dimension of the disk magazine having a plurality of optical disks therein and the optical disk apparatus using such a disk magazine can be realized.

Other objects, features and advantages of the invention will become apparent from the following description of the embodiments of the invention taken in conjunction with the accompanying drawings.

BRIEF DESCRIPTION OF THE DRAWINGS

FIG. 11 is a diagram for describing a state where the disk holding portion holds the optical disks in the embodiment of the invention;

DESCRIPTION OF THE EMBODIMENTS

An embodiment of the invention will be described hereinbelow with reference to the drawings.

Figure 1:
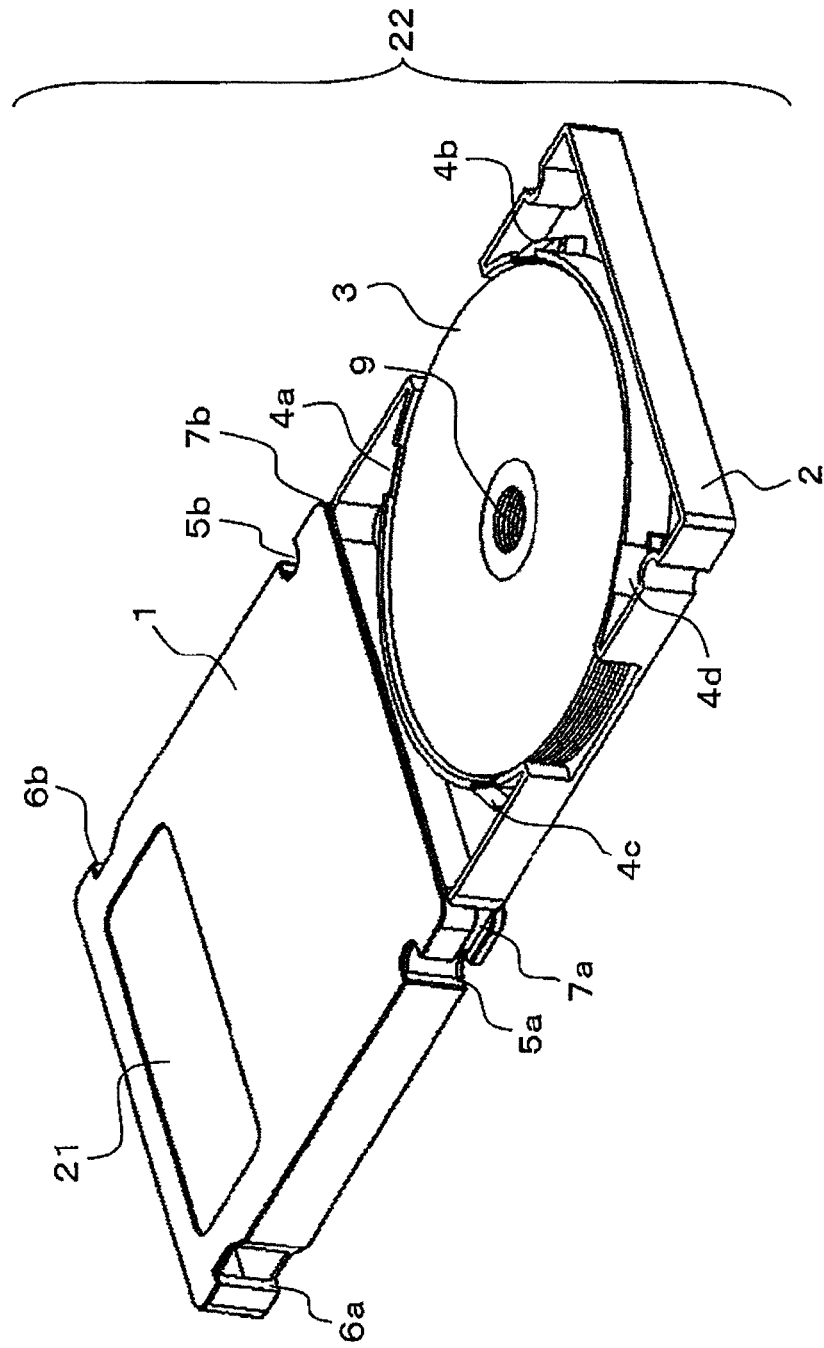
FIG. 1 is an external view of a disk magazine having a plurality of optical disks therein in an embodiment of the invention.
Figure 2:
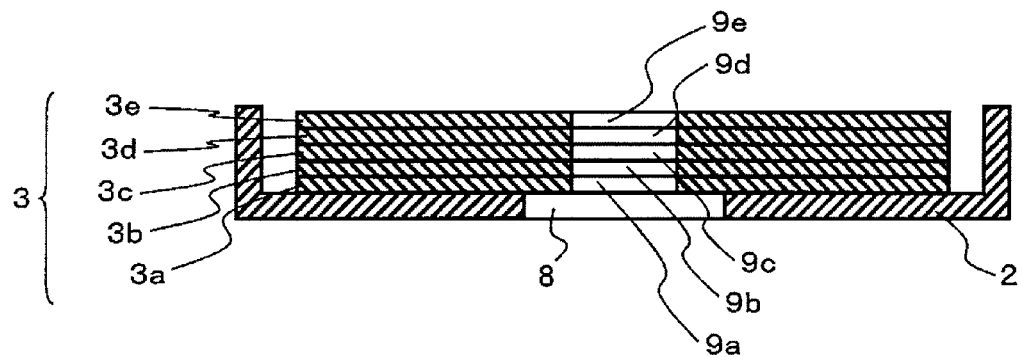
FIG. 2 is a cross sectional view of a casing and optical disks constructing the disk magazine in the embodiment of the invention.
Figure 3:
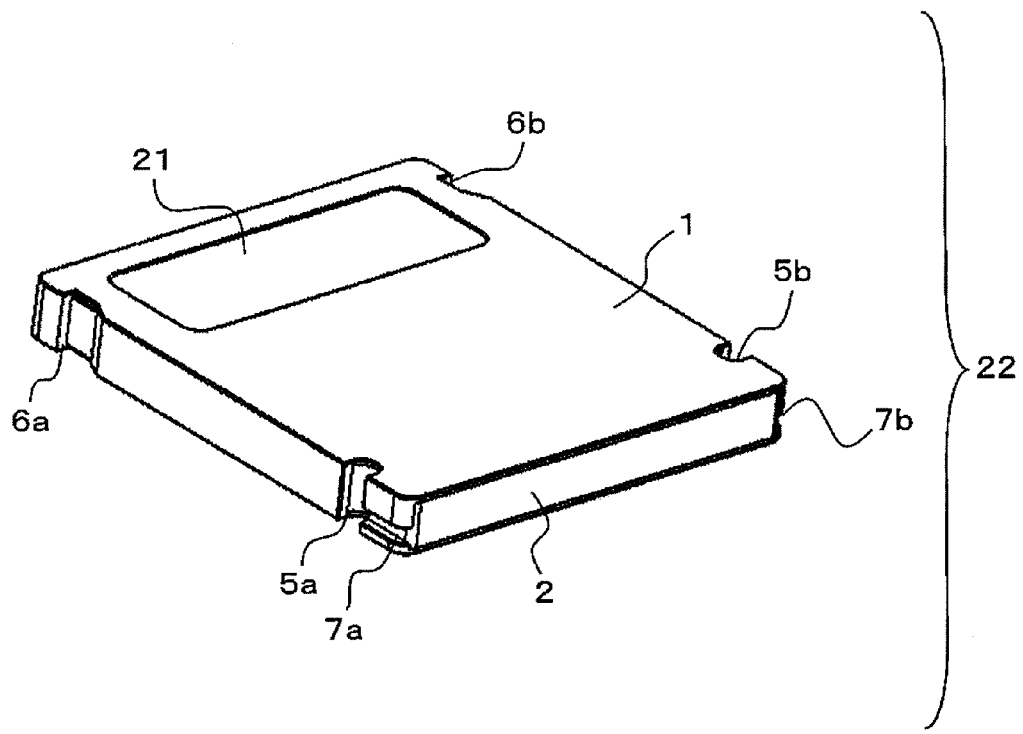
FIG. 3 is an external view of a disk magazine having a plurality of optical disks therein in the embodiment of the invention.

FIG. 1 is a schematic diagram of a disk magazine showing an embodiment of the invention. A disk magazine 22 has: a casing 1 which substantially forms an outer shape of the disk magazine; and a casing 2 in which a plurality of optical disks 3 are stacked and contained. FIG. 2 is a cross sectional view of a state where the optical disks 3 are mounted in the casing 2. In this instance, five optical disks are mounted. FIG. 3 is a schematic diagram of the disk magazine 22 in a state where the casing 2 is contained inside the casing 1. Detents 5a, 5b, 6a, and 6b which can be used as return stoppers at the time when the optical disk apparatus loads/ejects the disk magazine 22 are formed in the disk magazine 22. A label area 21 is prepared in such a manner that the user can adhere a label when the disk magazine 22 is located out of the optical disk apparatus. The disk magazine 22 has such a structure that when it is located out of the optical disk apparatus, the casing 2 is enclosed in the casing 1 and the optical disk 3 is not exposed to the outside as illustrated in FIG. 3. Thus, a deposition of a foreign matter to the optical disk 3 is prevented or an unexpected damage is prevented. Slits 7a and 7b are provided for the casing 1. The optical disk apparatus can hold the casing 2 through the slits 7a and 7b. When the disk magazine 22 is inserted into the optical disk apparatus, the optical disk apparatus executes such an operation that after the casing 2 was held through the slits 7a and 7b, the casing 2 is pulled out from the casing 1, and the optical disk 3 is arranged at a predetermined position in the optical disk apparatus.

As illustrated in FIG. 2, the optical disks 3a, 3b, 3c, 3d, and 3e are stacked and mounted in the casing 2. At this time, the optical disks are directly stacked without using trays or partition plates among the optical disks. By this method, as compared with the case where the trays or partition plates are provided, an interval between the mounted optical disks becomes minimum and a thickness of disk magazine 22 can be reduced.

As illustrated in FIG. 2, center holes 9a, 9b, 9c, 9d, and 9e are formed in the optical disks 3a, 3b, 3c, 3d, and 3e, respectively, and an opening portion 8 is formed in the casing 2 at a position near a center hole.

As illustrated in FIG. 1, disk holding members 4a, 4b, 4c and 4d are provided for the casing 2. In the invention, since the optical disks are not separated by using the trays, partition plates, or the like, there is a possibility that when the optical disks are mutually rubbed, a damage occurs. Therefore, the damage due to the rubbing is prevented by arranging members for fixing the optical disks 3 in the disk magazine 22 and suppressing motions of the disks.

Figure 4:
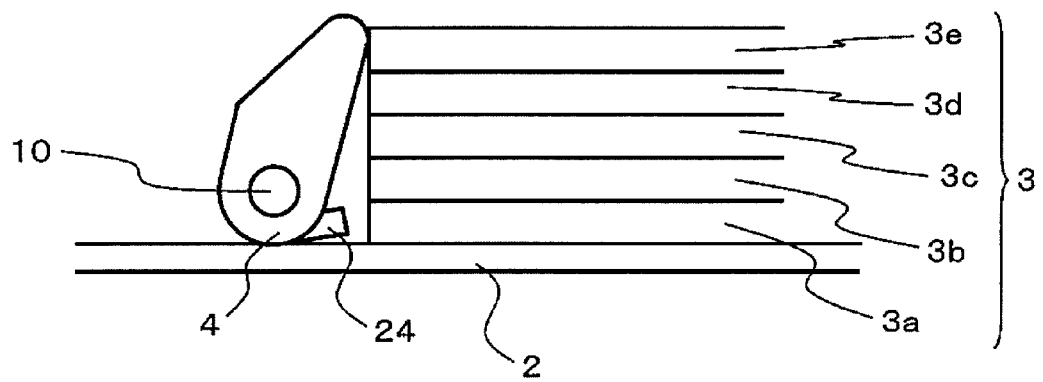
FIG. 4 is a diagram for describing a fixing method of the optical disks by a disk holding member in the embodiment of the invention.

A disk holding member 4 will be described with reference to FIG. 4. FIG. 4 is a side view of the disk holding member 4. The disk holding member 4 has such a structure that it is rotatable around a fulcrum 10 as a center. The disk holding member 4 is urged by a spring (not shown) in the direction of the optical disk 3e so as to press and hold an outer periphery or an outer peripheral edge portion of the optical disk 3e. By pressing the optical disk 3e, the optical disks 3a, 3b, 3c, and 3d sandwiched between the optical disk 3e and the casing 2 are also held. When the optical disk is removed from the casing 2, the rotation of the disk holding member 4 in the direction of the optical disk is restricted by a stopper 24. When the optical disks 3 are pulled upward by a force larger than a frictional force or an urging force of the disk holding member 4, the optical disks 3 can be taken out of the casing 2. Since a front edge of the disk holding member 4 has an arc shape, by pressing the optical disks 3 from the upward direction by the force which is equal to or larger than the urging force, the disk holding member 4 is opened to the outside, thereby enabling the optical disks 3 to be loaded into the casing 2.

Figure 5:
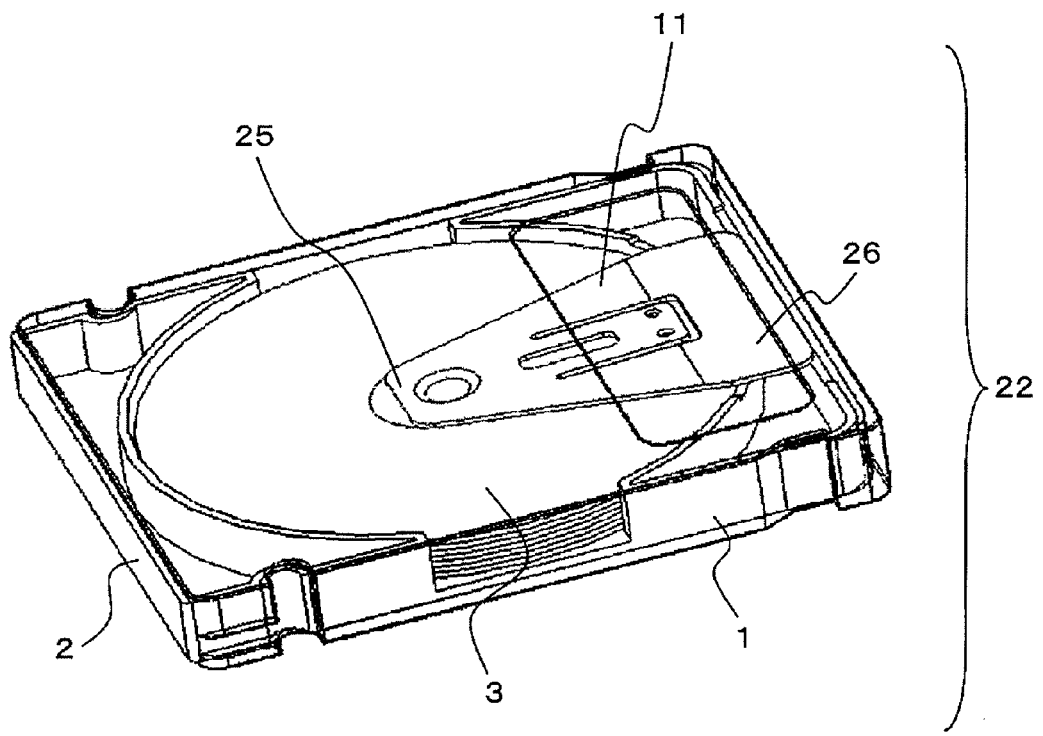
FIG. 5 is a diagram for describing a fixing method of the optical disks by a disk fixing spring in the embodiment of the invention.
Figure 6:
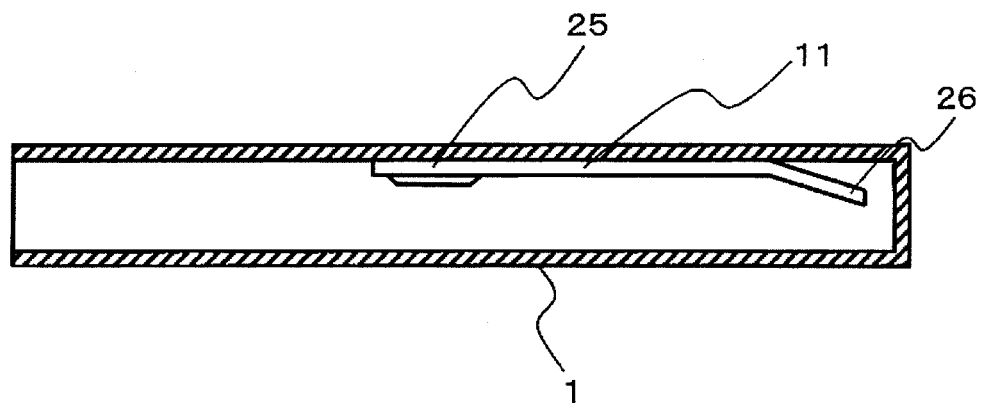
FIG. 6 is a diagram for describing a shape of the disk fixing spring in the embodiment of the invention.

Another embodiment in which the motion of the optical disks in the disk magazine is suppressed will now be described with reference to FIGS. 5 and 6. FIG. 5 is a perspective view of the casing 1 in the disk magazine 22. A disk fixing spring 11 for pressing a portion near the center hole of the optical disk 3 is arranged in the disk magazine 22. The disk fixing spring 11 has such a structure that when the casing 2 exists in the casing 1, the optical disks 3 are pressed and fixed by a disk pressing portion 25. FIG. 6 is a cross sectional view of the casing 1. The disk fixing spring 11 is attached to the casing 1. In a state where the casing 2 is not set, the disk pressing portion 25 is located near the casing 1. A bending portion 26 is provided for a rear portion of the disk fixing spring 11 and is bent in the downward direction. When the casing 2 is set into the casing 1, the casing 2 is come into contact with the bending portion 26 first. When the casing 2 is further pressed from this state, the bending portion 26 is pushed upward and the disk pressing portion 25 is moved downward, so that the optical disks 3 can be pressed and fixed.

By fixing the optical disks in the disk magazine by the optical disk holding member as mentioned above, the friction between the optical disks and the friction between the optical disk and the casing are prevented and the damage of the disk can be prevented. A fixing method of the optical disks is not limited to the foregoing method but another method may be used so long as it is a method of suppressing the motion of the optical disks in the disk magazine.

Figure 7:
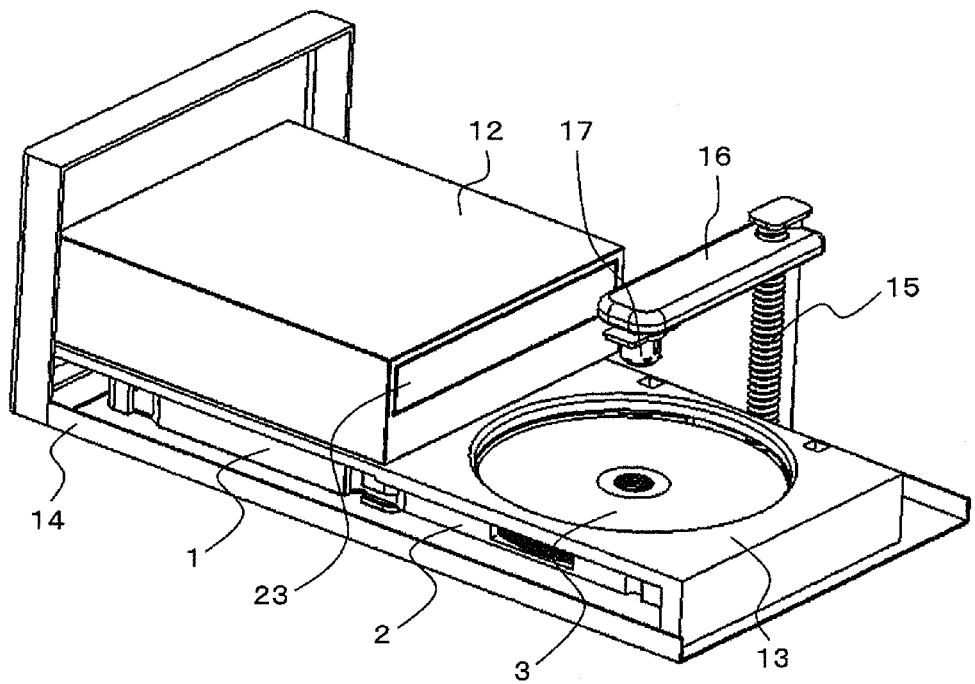
FIG. 7 is a diagram for describing a disk conveyance from the disk magazine to a disk drive in the embodiment of the invention.

Subsequently, an embodiment of the optical disk apparatus using the disk magazine of the invention will be described. FIG. 7 is a diagram for describing the inside of the optical disk apparatus using the disk magazine of the invention. An optical disk apparatus 14 has therein: a disk drive 12; a disk conveying mechanism comprising a disk holding portion 17 and a conveying arm 16; a shaft 15 for vertically moving the disk conveying mechanism; a member 13 for suppressing the disk leap out of the disk apparatus; and the like. When the disk magazine is inserted into the optical disk apparatus 14, a loading mechanism (not shown) loads the disk magazine to a predetermined position, thereafter, pulls out the casing 2 from the casing 1, and arranges the casing 2 to a lower portion of the suppressing member 13. The suppressing member 13 is arranged to suppress the optical disks 3 from leaping out of the casing 2. The disk drive 12 opens a disk tray 23, puts the optical disk onto the disk tray 23, and closes the disk tray 23, thereby executing the loading operation of the optical disk. The position where the optical disk 3 was disposed is a lower portion at the time when the disk tray 23 has been opened. By moving the optical disk in the vertical direction, the disk conveying mechanism conveys the optical disk between the disk magazine and the disk drive.

Figure 8:
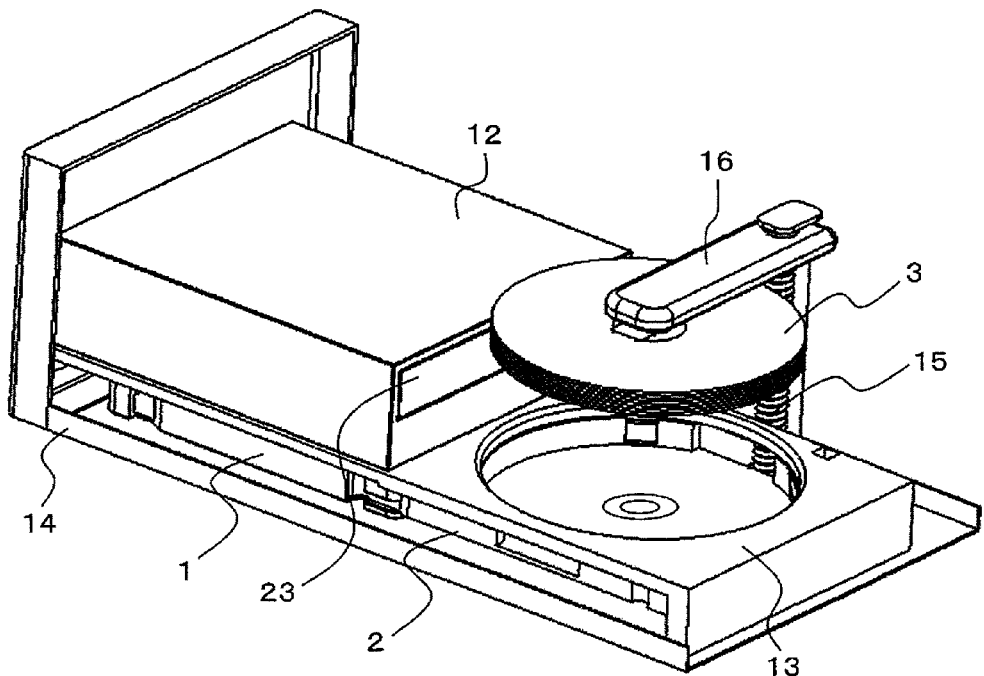
FIG. 8 is a diagram for describing a disk conveyance from the disk magazine to the disk drive in the embodiment of the invention.
Figure 9:
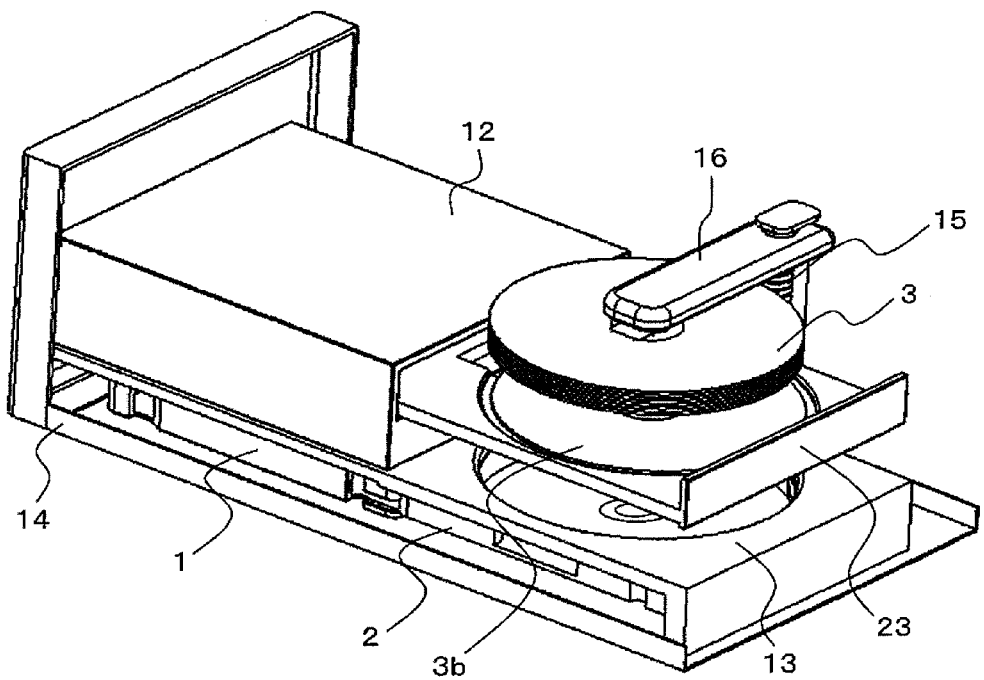
FIG. 9 is a diagram for describing a disk conveyance from the disk magazine to the disk drive in the embodiment of the invention.

Subsequently, a conveying procedure for conveying an arbitrary optical disk from the disk magazine to the disk drive will be described with reference to FIGS. 8 and 9. In this instance, a procedure for moving the Nth (N: an integer) optical disk 3b from the top one of the stacked optical disks 3 will be described. First, a conveying arm 16 is moved in the direction of the optical disks 3. The stacked N optical disks 3 are held by the disk holding portion 17 and the conveying arm 16 is moved upward. At this time, the Nth optical disk 3b is located at the bottom end of the stacked N optical disks 3. As illustrated in FIG. 9, the disk tray 23 of the disk drive 12 is opened and only the bottom one of the stacked N optical disks 3 is released, thereby putting the Nth optical disk 3b onto the disk tray 23. The disk tray 23 is closed and the conveyance is finished. The conveyance of the optical disk from the disk drive 12 to the disk magazine is executed by a procedure opposite to the above conveying procedure.

Even in the disk magazine in which the optical disks are stacked without using the trays and partition plates, an arbitrary optical disk can be conveyed to the disk drive at a high speed by the foregoing method.

Figure 10:
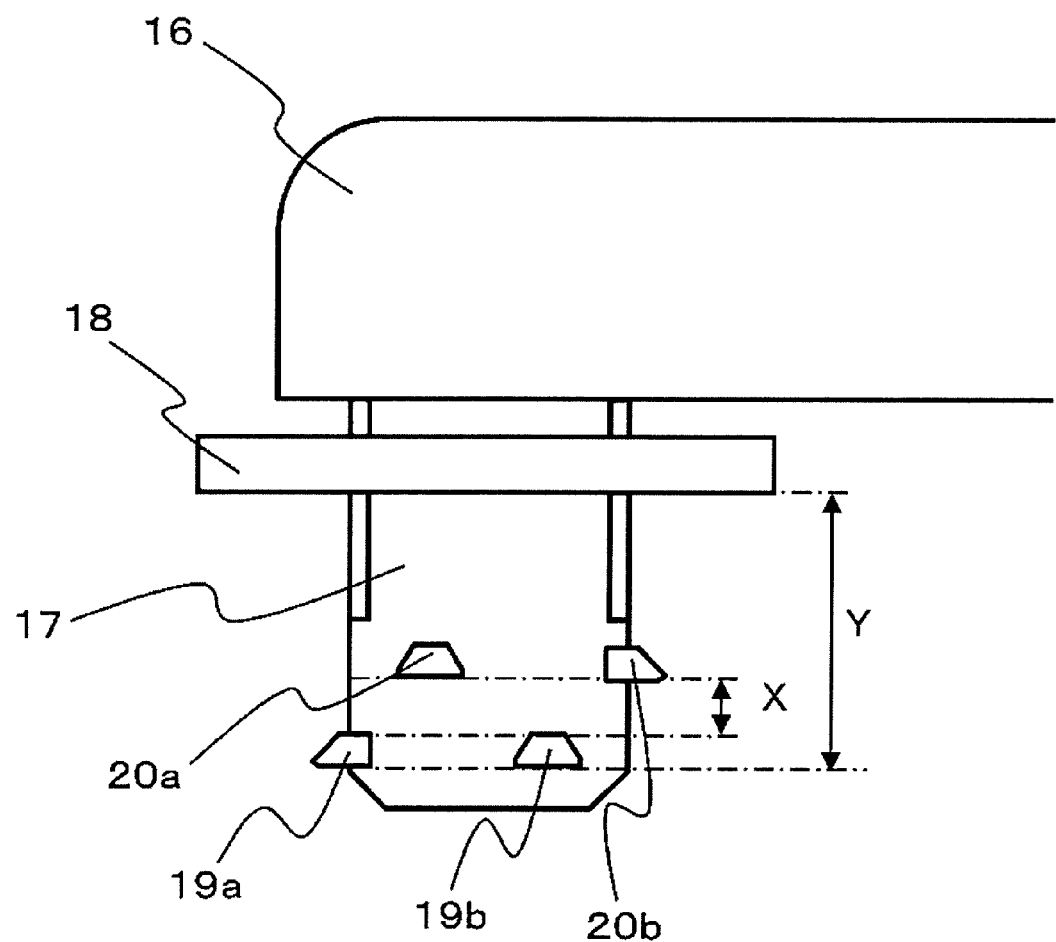
FIG. 10 is a diagram for describing a structure of a disk holding portion of a disk conveying mechanism in the embodiment of the invention.

Subsequently, the conveying mechanism for holding and conveying the stacked N optical disks will be described with reference to FIG. 10. FIG. 10 is a side view of the conveying arm 16 constructing the conveying mechanism of the disk and the disk holding portion 17. The disk holding portion 17 is attached to a front edge of the conveying arm 16. The disk holding portion 17 has first disk holding claws 19a and 19b, second disk holding claws 20a and 20b, and a detecting unit 18 for detecting the number of optical disks (hereinbelow, referred to as a disk number detecting unit 18). The first disk holding claws 19a and 19b and the second disk holding claws 20a and 20b have such a structure that they can be projected and enclosed from/into the disk holding portion 17. The first disk holding claws 19a and 19b and the second disk holding claws 20a and 20b are arranged in such a manner that an interval X between them is almost equal to a thickness of one optical disk. The disk number detecting unit 18 has a function for detecting the number of optical disks by detecting a distance Y between the first disk holding claws 19a and 19b. The detection of the distance Y may be realized by using any sensor such as photosensor, magnetic sensor, or the like.

A procedure for holding the stacked N optical disks will be described with reference to FIG. 11. FIG. 11 is a diagram showing the conveying arm 16 and the disk holding portion 17 and also showing a cross sectional view of the optical disks 3 and the casing 2. First, the first disk holding claws 19a and 19b and the second disk holding claws 20a and 20b are enclosed in the disk holding portion 17, respectively. Subsequently, the conveying arm 16 is moved in the direction of the optical disks 3. The disk holding portion 17 is inserted into a center hole 9 of the optical disks 3 and the conveying arm 16 is stopped with reference to the distance Y detected by the disk number detecting unit 18. In this state, the first disk holding claws 19a and 19b are projected to the outside, the optical disks 3b, 3c, 3d, and 3e are held, and the conveying arm 16 is moved upward. The optical disk apparatus has such a structure that the opening portion 8 is formed in the casing 2 at a position near the center hole so that even the bottom optical disk can be held, and the disk holding portion 17 and the first disk holding claws 19a and 19b are not interfered.

Figure 12A:
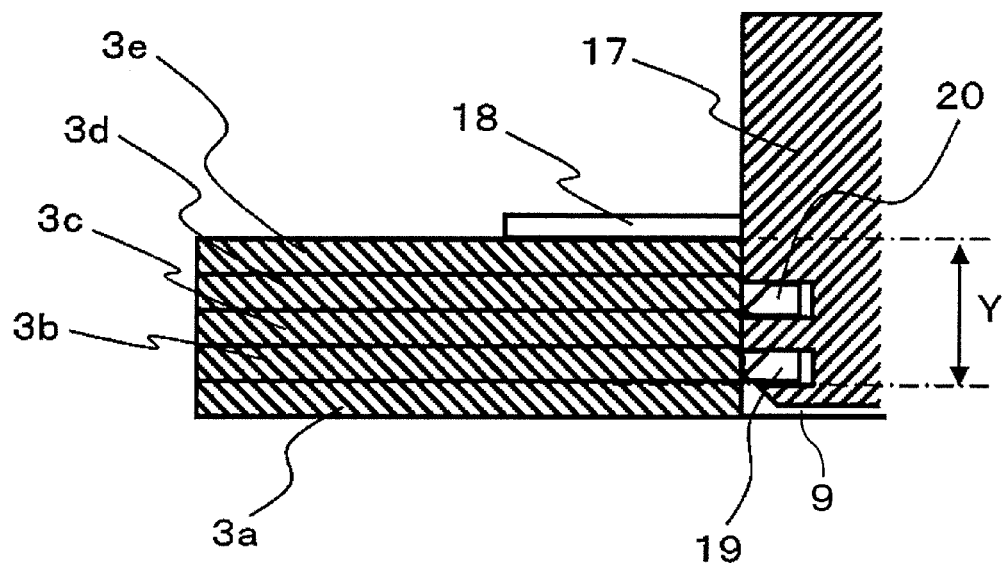
FIG. 12A is a diagram for describing an optical disk holding state by disk holding claws in the embodiment of the invention.
Figure 12B:
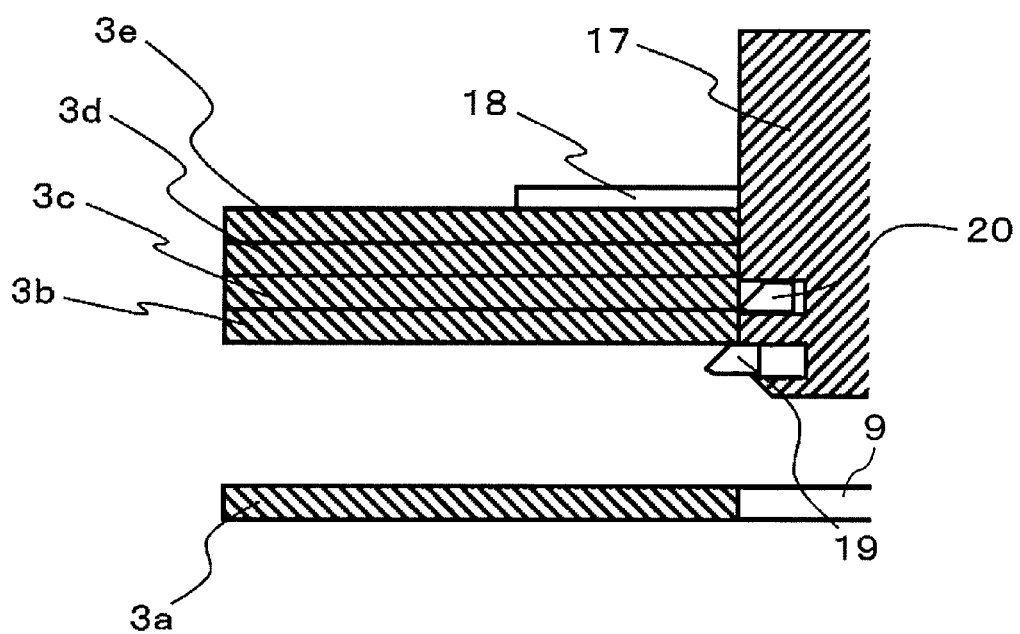
FIG. 12B is a diagram for describing an optical disk holding state by the disk holding claws in the embodiment of the invention.
Figure 12C:
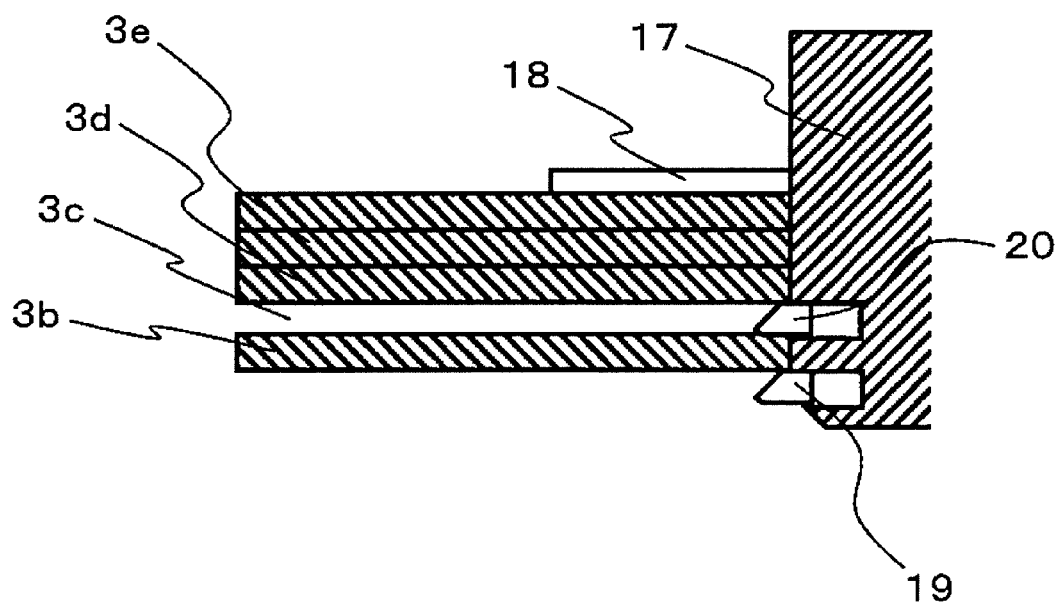
FIG. 12C is a diagram for describing an optical disk holding state by the disk holding claws in the embodiment of the invention.
Figure 12D:
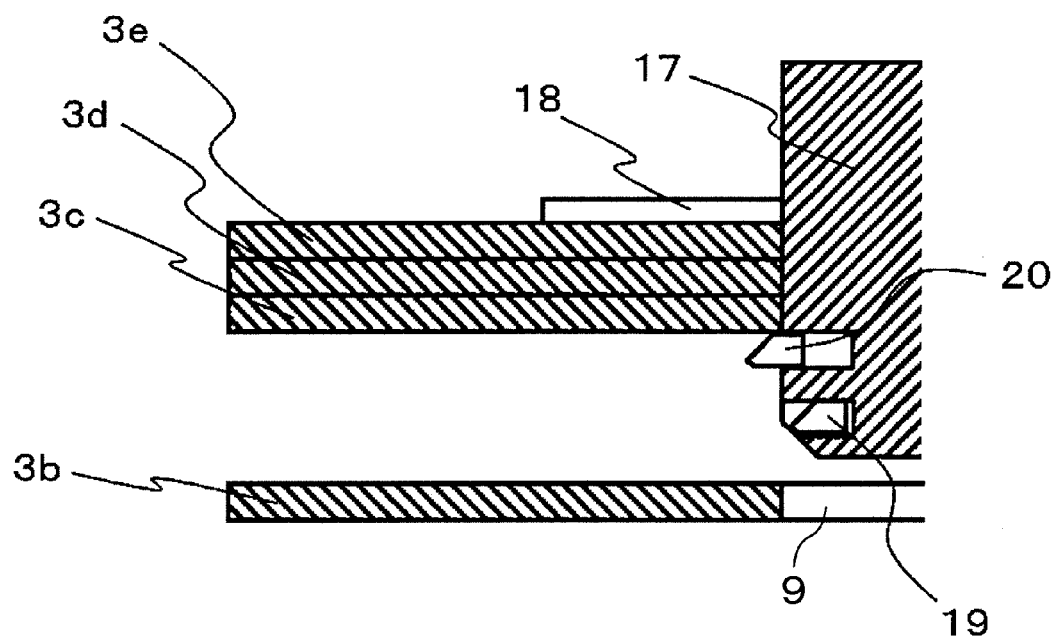
FIG. 12D is a diagram for describing an optical disk holding state by the disk holding claws in the embodiment of the invention.

A procedure for holding the stacked N optical disks and a procedure for cancelling the holding of only the Nth optical disk will be further described with reference to FIGS. 12A to 12D. FIGS. 12A to 12D are cross sectional views of the disk holding portion 17 and the stacked optical disks 3 and side views of the disk number detecting unit 18, a first disk holding claw 19, and a second disk holding claw 20. FIG. 12A illustrates a state where the disk holding portion 17 has been inserted into the center hole 9 of the optical disks 3 stacked in the casing 2. An insertion amount is detected by the disk number detecting unit 18 and control is made so that a front edge of the first disk holding claw 19 is located at a boundary between the optical disks 3a and 3b. For example, when there is a demand for holding of four optical disks, assuming that the thickness of one optical disk is equal to 1.2 mm, it is sufficient to control the conveying arm 16 so as to be located at a position where Y=4.8 mm. When the first disk holding claw 19 is projected from this state, the front edge has an acute angle and the first disk holding claw 19 enters between the optical disks 3a and 3b. By moving the disk holding portion 17 upward in this state, the optical disks existing on and over the optical disk 3b can be held as illustrated in FIG. 12B. A method of cancelling the holding of only the bottom optical disk among the plurality of held optical disks will be described with reference to FIGS. 12C and 12D. An interval between the first disk holding claw 19 and the second disk holding claw 20 is set to a value that is equal to the thickness of one optical disk. Therefore, when the optical disk 3b is held by the first disk holding claw 19, a front edge of the second disk holding claw 20 is located at a boundary between the optical disks 3b and 3c. When the second disk holding claw 20 is projected to the outside in this state, the optical disks existing on and over the optical disk 3c are held by the second disk holding claw 20 as illustrated in FIG. 12C. When the first disk holding claw 19 is enclosed in this state, the holding of the optical disk 3b can be cancelled. By this method, the holding of only the bottom one of the optical disks put on the disk tray of the disk drive can be cancelled and the conveyance of the target optical disk is realized.

In the embodiment, by setting the front edge of the disk holding claw to the acute angle, the disk holding claw is inserted between the optical disks and the disk is held.

However, the invention is not limited to such a structure but, for example, it is also possible to construct in such a manner that by pressing a flat portion to an inner peripheral surface of the center hole of the optical disks, a frictional force is generated and the disks are held. The optical disks may be held by using another method.

According to the invention as described with respect to the foregoing embodiments, an arbitrary optical disk can be selected and conveyed even in the disk magazine in which the optical disks are stacked without the trays or partition plates. Since the trays or partition plates do not exist, the interval between the optical disks in the disk magazine becomes minimum and the thin disk magazine can be realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus using a disk magazine in which optical disks are stacked and contained, comprising:
   conveying means for conveying said optical disk between said disk magazine and a a disk drive,
   wherein said optical disks have a hole portion at a center,
   wherein said conveying means has a disk holding portion comprising a substantially cylindrical member, the cylindrical member further comprising a first disk holding claw, and a second disk holding claw,
   wherein said disk holding portion is inserted into the hole portion of said optical disk, for conveying said optical disk using the holding claw, and said disk holding portion holds said optical disks stacked in a format to contact each other directly in the disk magazine,
   wherein said disk holding portion is configured to be capable of holding a plurality of optical disks in a lump,
   wherein said apparatus has a detecting unit for detecting the number of said plurality of optical disks held by said holding portion, and
   wherein said first disk holding claw and said second disk holding claw are arranged with a interval therebetween corresponding to a thickness of one optical disk.

2. An apparatus according to claim 1, wherein when the Nth optical disk, wherein N is an integer, from the top disk among the optical disks included in said disk magazine is conveyed to said disk drive, said Nth optical disk is held and moved by said conveying means, and the holding of only the Nth optical disk is cancelled and the Nth optical disk is conveyed by said disk drive portion.

3. An apparatus according to claim 1, wherein:
   when the Nth optical disk, wherein N is an integer, from the top disk among the optical disks included in said disk magazine is conveyed to said disk drive, while detecting the position by said disk number detecting unit, said first disk holding claw is moved to the position of the Nth optical disk, thereafter, the first disk holding claw is moved to an outside, and the Nth optical disk is held by said disk holding portion;

said second disk holding claw is moved to the outside and the (N-1) optical disks are held by said disk holding portion; and the N optical disks are moved by said conveying means to a position near said disk drive, thereafter, the first disk holding claw is moved to an inside, only the Nth optical disk is released, and the Nth optical disk is conveyed to the disk drive.

* * * * *